No. 824,811. PATENTED JULY 3, 1906.
I. H. PLEUKHARP.
SPEED CHANGING AND TRANSMISSION GEARING.
APPLICATION FILED OCT. 3, 1905.
2 SHEETS—SHEET 1.
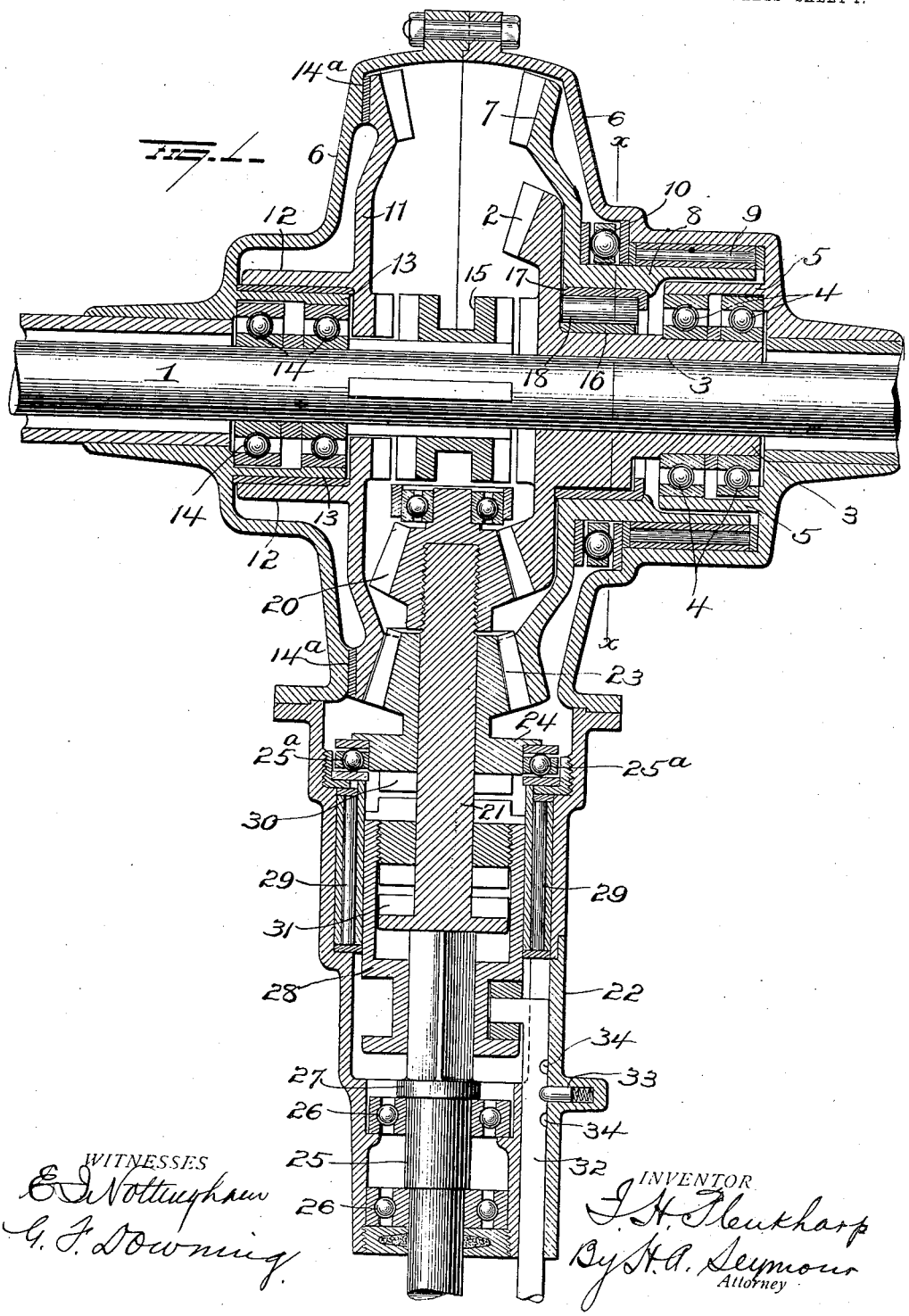

No. 824,811. PATENTED JULY 3, 1906.
I. H. PLEUKHARP.
SPEED CHANGING AND TRANSMISSION GEARING.
APPLICATION FILED OCT. 3, 1905.
2 SHEETS—SHEET 2.
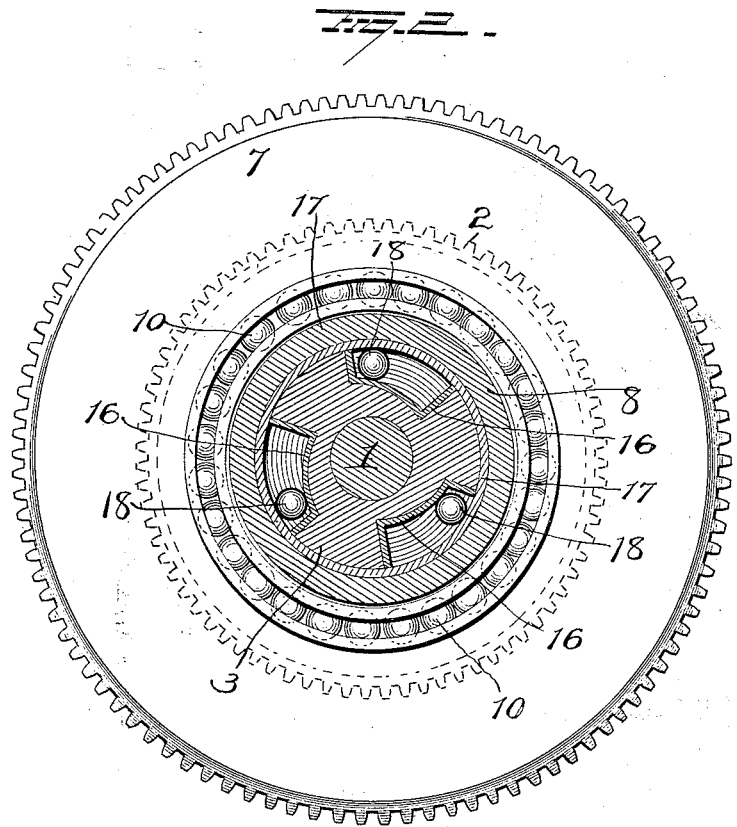
WITNESSES
INVENTOR

UNITED STATES PATENT OFFICE.

IRVIN H. PLEUKHARP, OF COLUMBUS, OHIO, ASSIGNOR TO THE DIRECT DRIVE AXLE COMPANY, OF COLUMBUS, OHIO.

SPEED CHANGING AND TRANSMISSION GEARING.

No. 824,811.     Specification of Letters Patent.     Patented July 3, 1906.

Application filed October 3, 1905. Serial No. 281,141.

*To all whom it may concern:*

Be it known that I, IRVIN H. PLEUKHARP, a resident of Columbus, in the county of Franklin and State of Ohio, have invented certain new and useful Improvements in Speed Changing and Transmission Gearing; and I do hereby declare the following to be a full, clear, and exact description of the invention, such as will enable others skilled in the art to which it appertains to make and use the same.

My invention relates to improvements in speed changing and transmission gearing, the object of the invention being to provide improved gearing connected directly to the driven shaft or axle by a clutch and not through the medium of differential gearing, as heretofore; and the invention consists in certain novel features of construction and combinations and arrangements of parts, as will be more fully hereinafter described, and pointed out in the claims.

In the accompanying drawings, Figure 1 is a view in section illustrating my improvements, and Fig. 2 is a view in section on the line *x x* thereof.

1 represents a shaft or axle to be driven, in connection with which, when the axle constitutes the driven axle of a motor-vehicle, any suitable mechanism may be provided at the wheel ends of the axle to compensate for the difference in speed when turning on a curve.

2 represents a high-speed forward-driving gear having an elongated hub or bearing 3 mounted to turn on axle or shaft 1 and provided with ball-bearings 4 around the hub between the same and an inwardly-projecting ring 5 in the gear-casing 6. A low-speed forward-driving gear 7 is located around gear 2 and is made with a tubular hub or journal 8, turning in roller-bearings 9 in a cylindrical portion or casing 6, and ball-bearings 10 are located back of the gear 7, as shown.

11 represents the low-speed reversing-gear, which faces gear 7 and has a tubular hub or bearing-sleeve 12 on its rear face turning around a tubular journal 13 on the casing 6, and ball-bearings 14 are located between this tubular journal 13 and axle or shaft 1. The casing 6, having a bearing-ring 14ª therein, receives the back pressure on gear 11 and holds it up to its driving-pinion, hereinafter referred to.

A clutch 15 is keyed to slide on shaft or axle 1 between the forward and reversing gears and is made with teeth at both ends to engage with similar teeth or notches in gear 2 or gear 11 to lock either of said gears to the shaft or lie idle between them.

The hub 3 of gear 2 is provided at intervals with recesses to receive hardened-steel pockets 16, and a hardened-steel ring 17 is located in the tubular hub or journal 8 of gear 7 and turns with the hub 8 around the hub 3. The inner or base walls of the pockets 16 are made in the form of cams or eccentrics, and rollers 18 are located in the pockets and held against longitudinal movement by an internal flange 19 on ring 17. By this arrangement of roller ratchet mechanism a clutch is formed between gears 2 and 7, for it will be observed that when gear 7 is driven the action of ring 17 against rollers 18 will cause the latter to roll along the pockets 16 and wedge between the pockets and ring to lock gears 7 and 2 together; but when gear 2 is driven the rollers will be moved to the other ends of the pockets and gear 2 will turn without turning gear 7.

A high-speed forward-driving pinion 20 meshes with gear 2 and is secured upon short shaft 21, projecting outward into a tubular gear-casing 22, secured to main casing 6, and said shaft 21 has ball-bearing support at its inner end, as shown. The low-speed driving-pinion 23 is mounted to turn freely about shaft 21 and meshes with the low-speed forward-driving gear 7 and also with the low-speed reversing-gear 11, and this pinion 23 is made with an enlarged hub portion 24, having ball-bearing mounting 25ª in the casing 22 to take the backward thrust of said pinion.

The drive-shaft 25, driven by any desired motor, projects into the tubular casing 22 and is supported in ball-bearings 26 to hold the drive-shaft in alinement with the shaft 21, said drive-shaft 25 abutting against the end of shaft 21 and is provided with an annular shoulder 27, located against one of the ball-bearing rings 26 to receive the backward thrust on high-speed pinion 20.

The inner end of drive-shaft 25 is made angular to slidingly key the outer hub portion of a clutch-sleeve 28 thereon, said clutch-sleeve surrounding the outer portion of shaft 21 and mounted to turn in roller-bearings 29 in tubular casing 22. This clutch-sleeve 28 is provided with clutch-teeth adapted to engage in notches 30 in the hub portion 24 of low-speed pinion 23 or engage similar notches 31 in the enlarged end of shaft 21 or lie out of engagement with either at a point between them. An operating-bar 32 for this clutch extends into the casing 22 and carries a roller at its inner end located in an annular groove in the hub portion of the clutch-sleeve 28, and a spring-pressed locking-pin 33 is provided in the casing to engage in any of a series of three notches 34 in the bar 32 to lock the bar and clutch at any of the three adjustments.

The operation of my improvements is as follows: With the parts in the positions shown it will be observed that as clutch 28 is not locked to either the pinion 23 or shaft 21 the drive-shaft 25 will turn without transmitting motion to the axle. If it is desired to go forward, clutch 28 is moved to lock with pinion 23, and the clutch 15 is moved to lock gear 2 directly with the shaft or axle 1. Motion is then transmitted from drive-shaft 25 to clutch 28, to pinion 23, to gear 7, and through the medium of the rollers 18, acting as clutch devices, between gears 7 and 2, as above explained. The said gears 7 and 2 will act as one large gear, which is connected directly to the shaft or axle by the clutch 15, and the axle will be driven forward at low speed. To reverse, clutch 15 is thrown into position to lock reversing-gear 11 directly to shaft or axle 1, and reverse motion is transmitted from pinion 23 to gear 11 to shaft or axle 1 to drive the latter in reverse direction at low speed. To attain high speed, clutch 15 locks gear 2 directly to shaft or axle 1, and clutch 28 is locked to shaft 21, which compels high-speed pinion 20 to turn gear 2, which latter rides freely within gear 7, as the rollers 18 will not lock the gears 2 and 7 together when the gear 2 is turned.

It will be observed that my improved gearing is connected directly with the shaft or axle without the interposition of any differential gearing, and by reason of this and other advantageous construction and arrangement of parts a very compact, strong, easy-running, and easily-operated speed-changing and reversing gearing is secured.

Having fully described my invention, what I claim as new, and desire to secure by Letters Patent, is—

1. The combination with a gear-wheel, of a larger gear around the same, roller-ratchet mechanism connecting said gears, pinions meshing with the respective gears, and means for turning either of said pinions.

2. The combination with a gear-wheel, of a larger gear-wheel around the same, said gears provided with cylindrical hub portions, roller-ratchet mechanism between the hubs, and driving-pinions meshing with the respective gears.

3. The combination with a gear-wheel having a cylindrical hub on its rear face, of a larger gear around the smaller gear and provided with a cylindrical hub surrounding the hub of smaller gear, said smaller-gear hub having cam or eccentric pockets, rollers in said pockets moved by contact with the hub of the larger gear to lock the gears together, and means for turning either of said gears.

4. The combination with a gear-wheel having a cylindrical hub on its rear face, of a larger gear around the smaller gear and having a hub surrounding the smaller-gear hub, cam or eccentric pockets supported in recesses in the smaller hub, rollers in said pockets, and a ring in the larger hub to move said rollers, and provided with an internal flange at one edge to hold the rollers against longitudinal movement.

5. The combination with an axle, of two forward-driving and one reversing gear turning freely about the axle, a clutch to lock either the reversing or high-speed driving-gear directly to the axle, and ratchet mechanism connecting the two forward-driving gears.

6. The combination with an axle, a high-speed forward-driving gear and a low-speed reversing-gear, both turning freely about the axle and facing each other, a low-speed forward-driving gear around the high-speed gear, and roller-ratchet mechanism connecting said forward-driving gears, of a clutch keyed to slide on the axle between the gears and constructed to lock either the high-speed or the reversing gear directly to the axle, a driving-pinion meshing with the high-speed gear, and another driving-pinion meshing with both low-speed gears.

In testimony whereof I have signed this specification in the presence of two subscribing witnesses.

IRVIN H. PLEUKHARP.

Witnesses:
S. W. FOSTER,
R. S. FERGUSON.